United States Patent
Feldpusch (10) Patent No.: US 12,294,610 B2
(45) Date of Patent: *May 6, 2025

(54) DYNAMICALLY SCALED DDOS MITIGATION

(71) Applicant: Level 3 Communications, LLC, Broomfield, CO (US)

(72) Inventor: Michael Feldpusch, Westminster, CO (US)

(73) Assignee: Level 3 Communications, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/382,233

(22) Filed: Oct. 20, 2023

(65) Prior Publication Data

US 2024/0048588 A1    Feb. 8, 2024

Related U.S. Application Data

(63) Continuation of application No. 17/223,909, filed on Apr. 6, 2021, now Pat. No. 11,799,902.

(60) Provisional application No. 63/058,957, filed on Jul. 30, 2020.

(51) Int. Cl.
*H04L 9/40* (2022.01)
*G06F 9/50* (2006.01)

(52) U.S. Cl.
CPC ........ *H04L 63/1458* (2013.01); *G06F 9/5027* (2013.01); *H04L 63/20* (2013.01)

(58) Field of Classification Search
CPC .......... H04L 63/1458; H04L 63/20; H04L 2463/144; G06F 9/5027
USPC .......................................... 726/23
See application file for complete search history.

(56) References Cited

U.S. PATENT DOCUMENTS

| | | | | |
|---|---|---|---|---|
| 11,799,902 B2 * | 10/2023 | Feldpusch | ........... | H04L 63/1458 |
| 2016/0182542 A1 * | 6/2016 | Staniford | ............ | H04L 63/1458 726/23 |
| 2021/0067489 A1 * | 3/2021 | Jayawardena | ...... | H04L 67/1097 |
| 2021/0185083 A1 * | 6/2021 | Azaria | ................ | H04L 63/1458 |
| 2022/0038493 A1 | 2/2022 | Feldpusch | | |

FOREIGN PATENT DOCUMENTS

| | | | | |
|---|---|---|---|---|
| CN | 111277660 | | 9/2021 | |
| CN | 111277660 B | * | 9/2021 | ............. H04L 67/10 |

* cited by examiner

*Primary Examiner* — Kambiz Zand
*Assistant Examiner* — Aubrey H Wyszynski (57) ABSTRACT

Systems and methods for dynamically mitigating a DDOS attack. In an aspect, the technology relates to a computer-implemented method for dynamically mitigating a distributed-denial-of-service (DDOS) attack. The computer-implemented method may include detecting a DDOS attack directing malicious traffic to a target, identifying one or more source locations of the malicious traffic, and in response to detecting the DDOS attack, activating one or more scrub clusters in the identified one or more source locations of the malicious traffic. The method may further include directing traffic intended for the target to the to the activated one or more scrub clusters, detecting an end of the DDOS attack, and in response to detecting the end of the DDOS attack, deactivating the one or more scrub clusters to release hardware resources.

14 Claims, 11 Drawing Sheets

DYNAMICALLY SCALED DDOS MITIGATION

BACKGROUND

A distributed-denial-of-service (DDOS) attack is an act of using a network to take down or disrupt a customer connection. DDOS attacks generally utilize multiple computing systems as sources of traffic to overwhelm a particular target or targets. Carrying out a DDOS attack may include taking control of the multiple computing machines, potentially including internet-of-things (IoT) devices, to operate as bots. The attacker forms a group of bots to form a botnet that launches the attack.

It is with respect to these and other general considerations that the aspects disclosed herein have been made. Also, although relatively specific problems may be discussed herein, it should be understood that the examples should not be limited to solving the specific problems identified in the background or elsewhere in this disclosure.

SUMMARY

Examples of the present disclosure describe systems and methods for dynamically mitigating a DDOS attack. In an aspect, the technology relates to a computer-implemented method for dynamically mitigating a distributed-denial-of-service (DDOS) attack. The computer-implemented method includes detecting a DDOS attack directing malicious traffic to a target, identifying one or more source locations of the malicious traffic, and in response to detecting the DDOS attack, activating one or more scrub clusters in the identified one or more source locations of the malicious traffic. The method further includes directing traffic intended for the target to the to the activated one or more scrub clusters, detecting an end of the DDOS attack, and in response to detecting the end of the DDOS attack, deactivating the one or more scrub clusters to release hardware resources.

In an example, activating the one or more scrub clusters includes activating the scrub clusters as virtual network functions (VNFs). In another example, the method further includes identifying available hardware at the identified source locations, and wherein the one or more scrub clusters are activated as VNFs on virtual machines of the identified available hardware. In a further example, the identified available hardware is part of a peering point of entry. In yet another example, directing the traffic intended for the target to the activated one or more scrub clusters comprises changing border gateway protocol (BGP) settings. In still another example, the method further includes determining a bandwidth consumed by the malicious traffic originating from the identified one or more source locations; and a capacity of the one or more scrub clusters is based on the determined bandwidth. In still yet another example, the method further includes directing valid traffic from the one or more scrub clusters to the target over a private connection.

In another aspect, the technology relates to a method for dynamically mitigating a distributed-denial-of-service (DDOS) attack. The computer-implemented method includes detecting a DDOS attack directing malicious traffic to a target, identifying a first source location and a second source location of the malicious traffic, determining a first bandwidth consumed by the malicious traffic originating from the first source location, and determining a second bandwidth consumed by the malicious traffic originating from the second source location. The method further includes, in response to detecting the DDOS attack, activating a first scrub cluster at the first source location, wherein the size of the first scrub cluster is based on the determined first bandwidth, and activating a second scrub cluster at the second source location, wherein the size of the second scrub cluster is based on the determined second bandwidth. The method also includes detecting an end of the DDOS attack and, in response to detecting the end of the DDOS attack, deactivating the first scrub cluster and the second scrub cluster to release hardware resources.

In an example, activating the first scrub cluster includes activating the first scrub clusters as a VNF. In another example, the first source location is a city. In a further example, the first source location is a peering point of entry. In yet another example, the method further includes, subsequent to activating the first scrub cluster, determining an updated bandwidth consumed by the malicious traffic originating from the first source location; and based on the determined updated bandwidth, adjusting a size of the first scrub cluster. In still another example, the method further includes determining an attack type of the DDOS attack; and based on the determined attack type, selecting a scrubber type for the first scrub cluster. In still yet another example, the attack type is determined based on a destination port of the malicious traffic.

In another aspect, the technology relates to a system for dynamically mitigating a distributed-denial-of-service (DDOS) attack of a customer of a network. The system includes a processor and memory storing instructions that when executed by the at least one processor cause the system to perform a set of operations. The set of operations include receiving traffic data from network components of the network, based on the received traffic data, detecting a DDOS attack directing malicious traffic to the customer, identifying a plurality of source locations of the malicious traffic, determining a bandwidth consumed by the malicious traffic originating from the source locations, and based on the determined bandwidth, deploying a mitigation swarm to the identified plurality of source locations.

In an example, deploying the mitigation swarm includes activating a scrub cluster in each of the plurality of source locations. In a further example, the scrub cluster is activated as a VNF on a virtual machine. In another example, the size of the scrub cluster is based on the determined bandwidth. In yet another example, the operations also include directing traffic intended for customer to the to the activated scrub cluster, detecting an end of the DDOS attack, and in response to detecting the end of the DDOS attack, deactivating the activated scrub cluster to release hardware resources. In still another example, the plurality of source locations includes at least one peering point of entry.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

A DDOS attack is obviously undesirable, and the sooner the DDOS attack can be mitigated, the sooner network performance is able to improve and the target of the attack is able to resume service. Mitigation of a DDOS attack generally includes filtering traffic directed to the target that is currently experiencing the DDOS attack. Once the traffic is filtered, the valid (non-malicious) traffic is forwarded to the target and the target can continue providing a service through the network.

Solutions to DDOS mitigation have generally been static in filtering or scrubbing traffic to the target. For example, some targets or customers may subscribe to an "always-on" DDOS mitigation service that continuously filters traffic to preemptively avoid DDOS attacks. The use of an always-on DDOS mitigation service, however, has several drawbacks, such as increased latency in the target receiving traffic. In other examples, targets or customers may choose a DDOS mitigation service that begins at the detection of a DDOS attack. Currently, such implementations require that traffic be rerouted to a static, dedicated filtering or scrubbing facility. Such an implementation has multiple drawbacks. First, from the perspective of the network of an internet service provider (ISP), the re-routed traffic may need to travel a long distance trough the network, which consumes bandwidth and resources of the network along the way. In addition, significant latency is also introduced as the traffic is re-routed over long distances. The hardware in the dedicated filtering facility is also fully consumed by filtering processes even when there is minimal traffic due to the lack of DDOS attacks occurring.

The present technology provides for improved DDOS mitigation by utilizing dynamically scaled DDOS mitigation techniques. With the present technology, when a DDOS attack is detected, the source location(s) from which the malicious DDOS traffic originated, and the bandwidth consumed by the DDOS traffic is determined. A cluster of DDOS scrubbers is then dynamically activated on hardware that is located proximate to the identified source location(s). The capacity or number of DDOS scrubbers that are activated may be based on the bandwidth consumed by the DDOS traffic, and the type of DDOS scrubbers may be based on the type of DDOS attack. The DDOS traffic is then directed to the activated DDOS scrubbers, where the traffic is scrubbed and the valid traffic is transmitted to the target. When the DDOS attack concludes, the DDOS scrubbers are deactivated and the hardware is free to perform other operations. By activating the DDOS scrubbers at a location proximate to the source location of the attack, latency is reduced and bandwidth consumption within the network by the DDOS traffic is also significantly reduced. For instance, the malicious traffic travels across the network for a shorter time and over a shorter distance before it is removed by a scrubber. Thus, the negative effects of the DDOS on the network are reduced.

As an example, from the perspective of a network or ISP, the source location may be considered a peering point of entry where traffic would enter the network of which the target is a customer. The particular peering point of entry at which the DDOS traffic enters the network is identified. The identified peering point of entry includes hardware that may operate virtual machines capable of executing virtual network functions, which may include DDOS scrubbers. Upon detection of the DDOS attack, a cluster of DDOS scrubbers based on bandwidth consumed by the attack is activated on the identified peering point of entry. DDOS traffic is then directed to the DDOS scrubbers until the DDOS attack concludes. In other examples, the present technology may also be utilized to mitigate DDOS attacks that originate from inside the network as well as traffic that is transient through the network (e.g., traveling through the network from one peer to another peer).

Figure 1A:
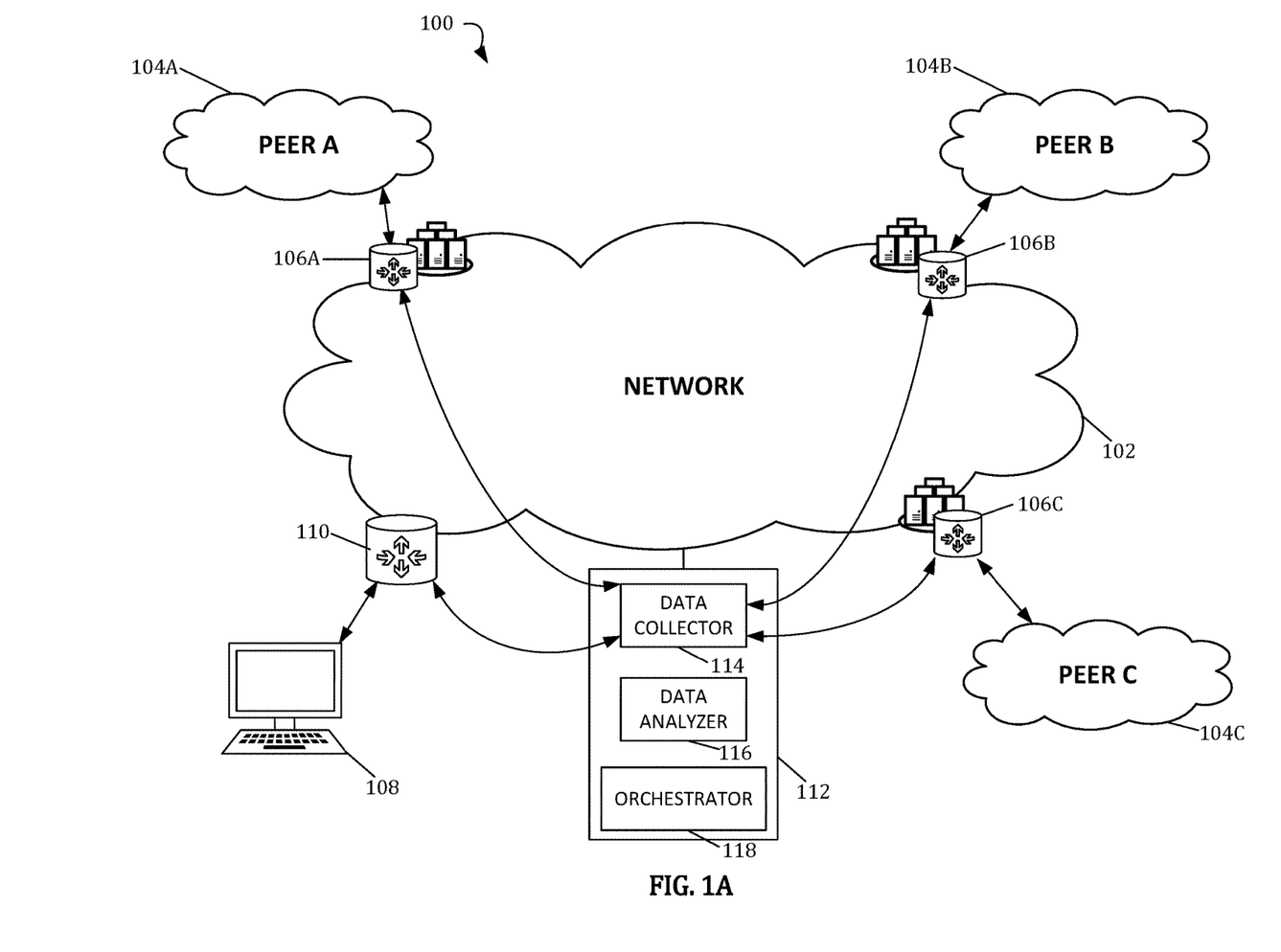
FIG. 1A depicts an example system for dynamically mitigating a DDOS attack.

FIGS. 1A-1D depict a system 100 for dynamically mitigating a DDOS attack. In addition, FIGS. 1A-1D depicts a sequence of events for dynamically mitigating a DDOS attack. In FIG. 1A, the system 100 is operating in a normal (i.e., non-DDOS attack) state. The system 100 includes a network 102. The network 102 may have a plurality of customers to which the network provides service. One example customer 108 is depicted in FIG. 1A. The customer 108 connects to the network via a point of entry, which, in this example, is gateway 110. While the customer 108 is depicted as a single device, the customer may include plurality of devices that may take up a block of IP addresses. When the network 102 is operating under normal conditions, at least with respect to customer 108, traffic is transmitted to and from the customer 108 through the network 102.

The network 102 may also be connected to a plurality of peer networks 104. In FIG. 1A, three different peer networks 104 are depicted. As should be appreciated, more or fewer peer networks may be able to communicate with the network 102. In some examples, the network 102 may be a large-scale network such as network managed by CenturyLink or Level3. In such an example, the peer networks 104 may be other large-scale networks, such as networks managed by Verizon, Comcast, AT&T, etc.

Each peer network 104 may connect to the network 102 at a peering point of entry 106. For example, Peer A 104A may connect to the network 102 at peering point of entry 106A, Peer B 104B may connect to the network 102 at peering point of entry 106B, and Peer C 104C may connect to the network 102 at peering point of entry 106C. Each of the peering points of entry 106 may include routing technology and additional computing hardware. The peering points of entry 106 may be network gateways and/or located at central offices (COs). The routing technology handles initial routing of traffic into the network 102. The routing technology may be virtualized and part of virtual network orchestration scheme. The computing hardware located at the peering points of entry 106 may also include software, such as a hypervisor, that supports the hosting of virtual machines. The virtual machines are emulations of physical computer systems and can execute virtual network functions (VNFs). VNFs are processes that handle specific network functions, such as scrubbing of traffic, firewalls, and load balancing. Multiple virtual machines and VNFs can be executed on the hardware located at the peering points of entry 106.

The system 100 also includes a DDOS mitigation subsystem 112. The DDOS mitigation subsystem 112 includes a collector component 114, an analyzer component 116, and an orchestrator component 118. The DDOS mitigation subsystem 112 is connected to routing components of the network 102, including at least the peering points of entry 106 and the gateway 110. The collector component 114 collects data regarding traffic that passes through the routing components of the network 102. The collected data may be NetFlow data and the collector component 114 may be a NetFlow collector. The collected data may also include other types of flow data, such J-Flow, s-Flow, or Netstream, among others. The traffic data may include information such as source IP address, destination IP address, IP protocol, source port, destination port, and/or the type of service associated with the packets or datagrams in the traffic. The traffic data may also include other information about different layers of the Open Systems Interconnection (OSI) model or stack.

The analyzer component 116 analyzes the traffic data collected by the collector component. Where the traffic data is NetFlow data, the analyzer component 116 may be a NetFlow analyzer. The analyzer component 116 may be used to detect the onset or occurrence of a DDOS attack by analyzing the traffic data. The orchestrator component 118 of the DDOS mitigation subsystem 112 orchestrates technologies within the network 102, such as the VNFs and virtual machines of the peering points of entry 106. Additional details regarding network orchestration are provided in U.S. Pat. No. 9,882,833, titled "Intent-Based Services Orchestration," which is incorporated by reference herein in its entirety. For example, Network Functions Virtualization ("NFV") and VNFs may be used to implement resource allocation for orchestration utilized by the technology described herein. Implementation of NFV and VNFs, in general, and as used in other network applications, is described in further detail in the U.S. patent application Ser. Nos. 14/730,695; 14/678,208; 14/678,280; and 14/678,309, which are also incorporated by reference in their entireties.

Figure 1B:
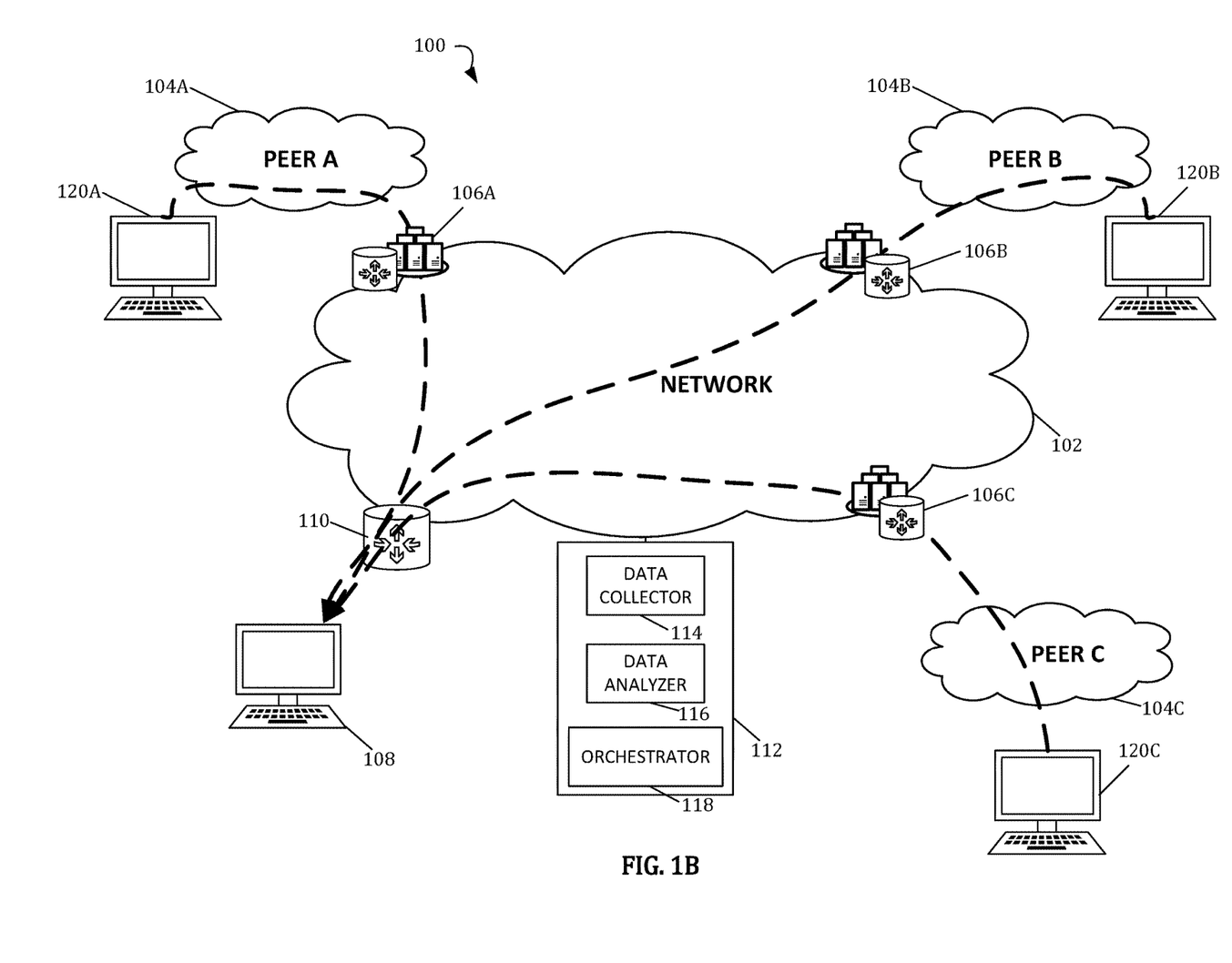
FIG. 1B depicts the example system of FIG. 1A under a DDOS attack.

FIG. 1B depicts the system 100 during a DDOS attack directed at the customer 108. When a DDOS attack is directed at the customer 108, the customer 108 may be referred to as the target of the attack. In the example DDOS attack depicted in FIG. 1B, the customer 108 receives an influx of traffic from three source machines 120. As should be appreciated, during a DDOS attack, many more machines may be involved to form a botnet and direct traffic at the customer 108, and the attack may generate terabytes of data or more. For clarity, the depictions of the connections of the DDOS mitigation subsystem 112 shown in FIG. 1A are not depicted in FIGS. 1B-1D. However, the DDOS mitigation subsystem 112 remains connected to the other components of the network 102, such as the peering points of entry 106 and the gateway 110 during the attack.

The traffic from a first source machine 120A flows through Peer A's network 104A and enters the network 102 at peering point of entry 106A and is then routed to the customer 108. Traffic from a second source machine 120B flows through Peer B's network 104B and enters the network 102 and peering point of entry 106B and is then routed to the customer 108. The traffic from the third source machine 120C flows through Peer C's network 104C and enters the network 102 at peering point of entry 106C and is then routed to customer 108.

As the malicious DDOS traffic flows into the network 102 via the peering points of entry 106, traffic data is collected by the collector component 114 of the DDOS mitigation subsystem 112. The traffic data is also analyzed by the analyzer component 116 to detect the DDOS attack and determine characteristics of the DDOS attack. The DDOS attack may be detected by evaluating a plurality of rules against the collected traffic data. Many different sets of rules and analytics exist for detecting DDOS attacks, and any such sets of rules may be utilized with the present technology. When the analyzer component 116 detects a DDOS attack, the analyzer component 116 may generate an event notification or trigger. The event notification or trigger may be provided to other components within the DDOS mitigation subsystem 112, such as the orchestrator component 118, and/or other components of the network 102. The event notification may also include analytics regarding the originating source location for the malicious DDOS traffic as well as the bandwidth consumed by the DDOS traffic. The source location of the malicious DDOS traffic may be the city from which the traffic is originating. For example, each peering point of entry 106 through which malicious DDOS traffic is flowing may be identified and the city of each peering point of entry may be identified. In addition, the bandwidth consumed by traffic flowing through each of the identified peering points of entry 106 may also be determined.

Figure 1C:
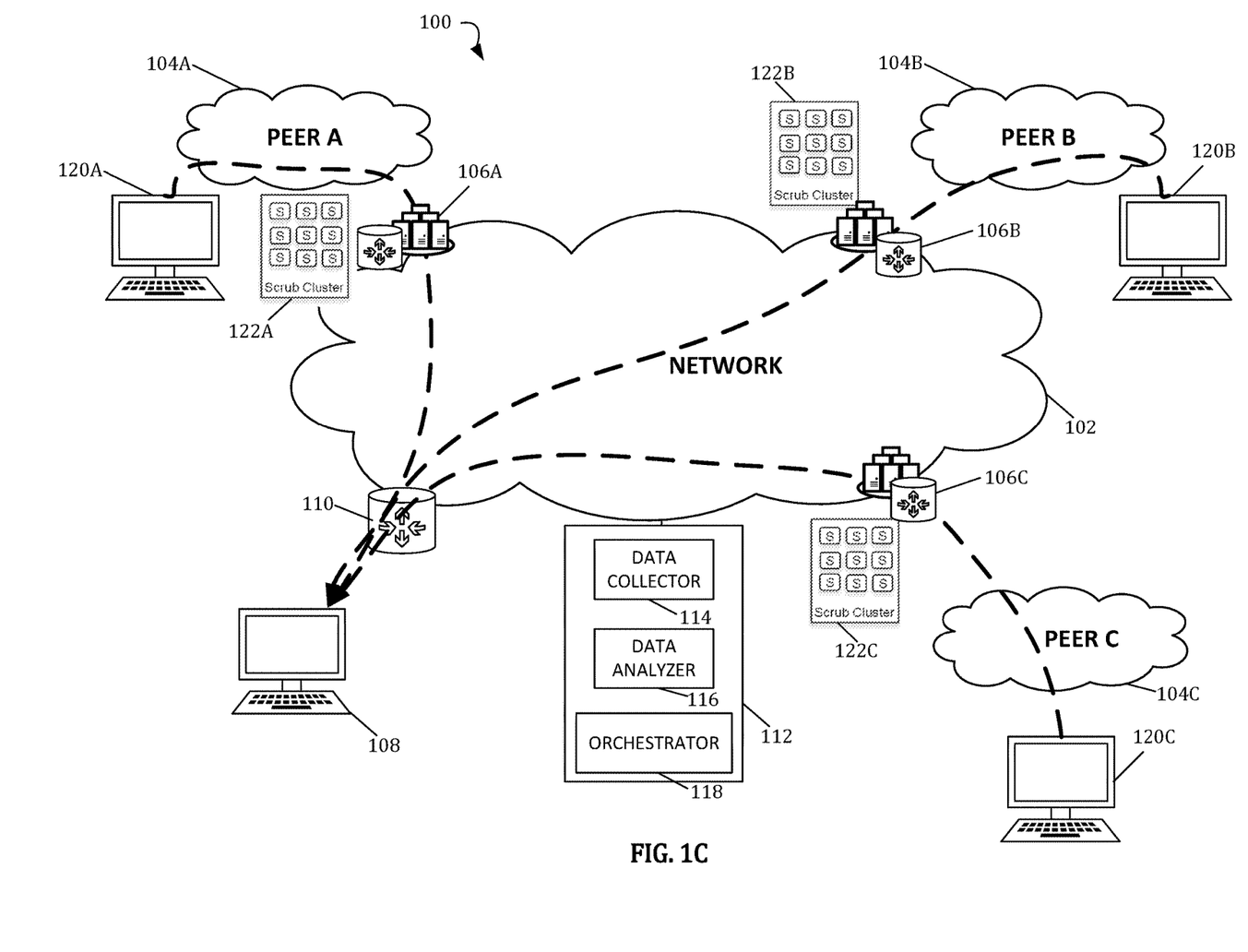
FIG. 1C depicts the example system of FIG. 1A at the onset of dynamically mitigating the DDOS attack.

FIG. 1C depicts the system 100 after the DDOS attack has been detected and mitigation of the DDOS attack has been initiated. Upon detection of the DDOS attack by the analyzer component 116, the orchestrator component 118 causes a mitigation swarm to be deployed. The mitigation swarm includes activating clusters of DDOS scrubbers at or near the identified source locations of the DDOS traffic. In the example depicted in FIG. 1C, DDOS traffic is entering the network 102 at peering point of entry 106A, peering point of entry 106B, and peering point of entry 106C. Accordingly, a cluster of DDOS scrubbers 122, also referred to herein as scrub clusters 122, are activated or deployed at or near peering point of entry 106A, peering point of entry 106B, and peering point of entry 106C. For example, a first scrub cluster 122A may be activated at peering point of entry 106A, a second scrub cluster 122B may be activated at peering point of entry 106B, and a third scrub cluster 122C may be activated at peering point of entry 106C. In some examples, activating the scrub clusters 122 at the peering points of entry 106 may include activating the scrub clusters 122 on hardware located in data centers at the peering points of entry 106.

The orchestrator component 118 may cause the activation of the scrub clusters 122 by sending instructions to each of the respective peering points of entry 106 or virtual machines for which the scrub clusters 122 are to be activated. The scrub clusters 122 may be implemented as VNFs operating on virtual machines executing on hardware located at the peering points of entry 106. The scrub clusters 122 may also be activated on hardware outside of the peering points of entry 106 but proximate the source locations of the DDOS attack or peering points of entry 106. For instance, for each city that is identified as a source location of the DDOS attack, a scrub cluster 122 may be activated on hardware available in or nearest each identified city or in a position that would result in the least latency increase or least cost.

The scrub clusters 122 may include multiple packet or datagram scrubbing functions or programs that are capable of scrubbing DDOS traffic to determine malicious packets versus valid packets. The scrubbing programs or virtual network functions that accomplish the DDOS scrubbing may be referred to herein as scrubbers. Each scrub cluster 122 may include one or more scrubbers. Many different types of the scrubbing algorithms and functions to accomplish such a task are available and may be implemented in the present technology.

The characteristics of each activated scrub cluster 122 may be based on the amount of the bandwidth being consumed by traffic originating from the source location or flowing through the particular peering point of entry 106. Each scrubber in the scrub cluster may have a maximum bandwidth that the scrubber can handle. For example, each scrubber may be able to handle 10 Gigabits per second (Gbps). In such an example, if a source location is generating 100 Gbps of malicious traffic, at least 10 scrubbers may be activated in the source location to have the capacity to handle the full bandwidth consumed by the malicious traffic. Each scrubber may be activated as a separate VNF and in some examples, may be activated on a separate virtual machine. In other examples, the bandwidth capacity of each scrubber may be adjustable at initialization or activation, which may affect the resource allocation of the underlying hardware resources, such as memory and processor allocations. The bandwidth consumed by the malicious traffic during the DDOS attack may also be monitored, and the scrubber capacity and/or number of scrubbers may be adjusted based on a change in bandwidth. Accordingly, if the size of the DDOS attack increases, the capacity of the activated scrub cluster 122 may also increase. Conversely, if the size of the DDOS attack decreases, the capacity of the activated scrub cluster may decrease to release hardware resources for other purposes or to conserve energy.

Figure 1D:
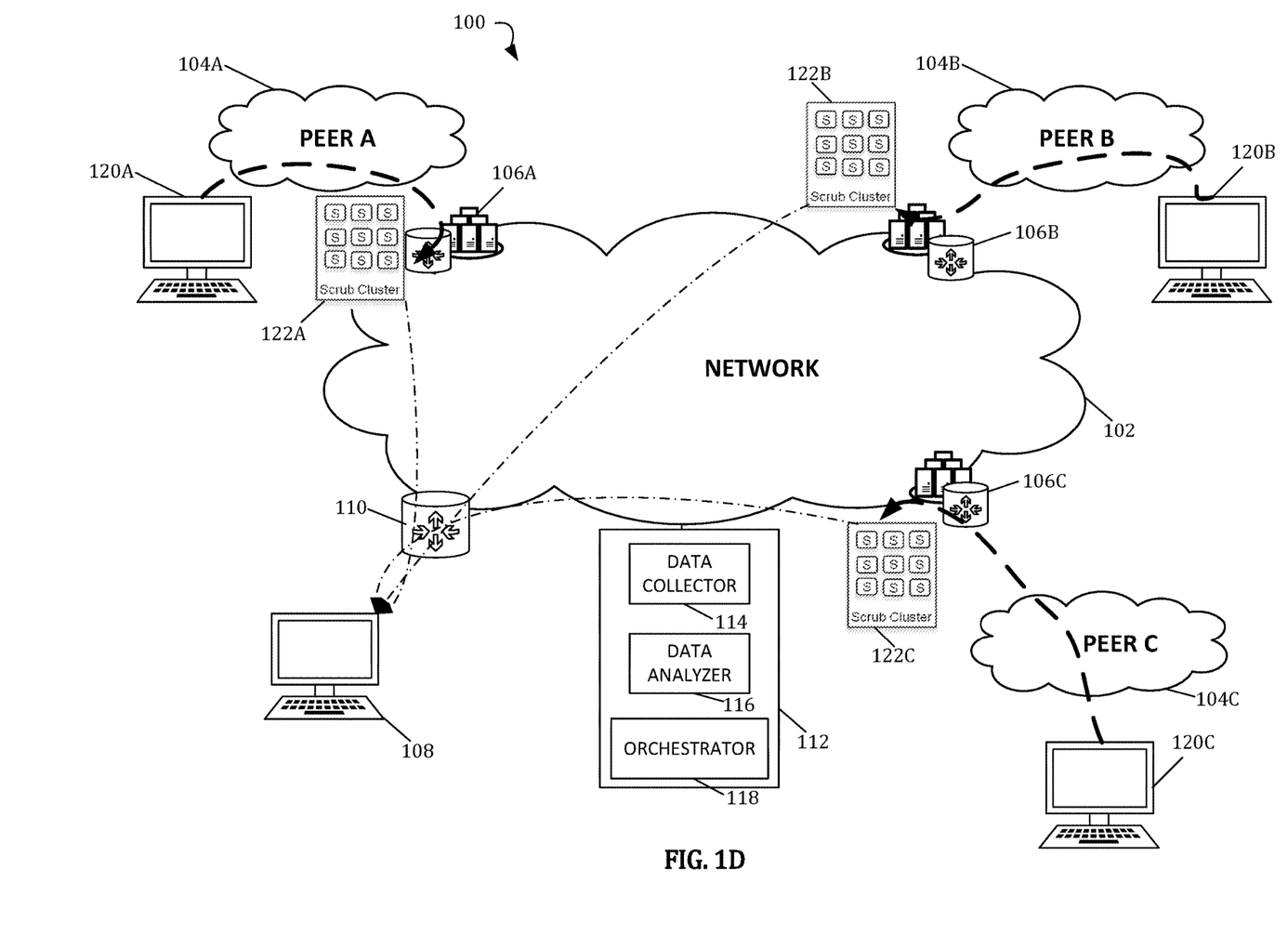
FIG. 1D depicts the example system of FIG. 1A during dynamic mitigation of the DDOS attack.

FIG. 1D depicts the system 100 during dynamic mitigation of the DDOS attack. After the scrub clusters 122 have been activated, traffic directed to the customer 108 (e.g., traffic having a destination IP address corresponding to the customer 108) is directed or rerouted to the scrub clusters 122. Directing or rerouting the traffic may include changing border gateway protocol (BGP) settings or characteristics of the network 102. BGP is a routing protocol for exchanging IP information between different entities of the network 102. For example, an application programming interface (API) call may be sent to network configuration tools to make BGP changes to the network that result in the traffic being rerouted to the scrub clusters 122. The BGP changes may include making Anycast configuration changes that cause the traffic to be rerouted to the scrub clusters 122. Anycast is a configuration scheme within BGP in which a single destination address has multiple routing paths to two or more endpoint destinations. The scrub clusters 122 may also announce the IP address or block of IP addresses for a subnet of the target, which may cause the traffic intended for the target to be routed to the scrub clusters 122. The rerouting of traffic may be performed on a location-by-location basis. For example, traffic originating from the first source machine 120A and/or a determined first source location may be rerouted to the first scrub cluster 122A. Traffic originating from the second source machine 120B and/or a determined second source location may be rerouted to the second scrub cluster 122B. Traffic originating from the third source machine 120C and/or a determined third source location may be rerouted to the third scrub cluster 122C.

Upon receiving the rerouted traffic, the scrub clusters 122 scrub or filter the packets and datagrams in the traffic. Traffic that is determined to be malicious is dropped and not forwarded on to the customer 108. The traffic that is determined to be valid (e.g., not malicious) is forwarded on to the customer 108 such that the customer can remain active. Due to the changes to routing of traffic (e.g., by changing BGP and/or Anycast configurations), the valid traffic is forwarded to the customer 108 on a private network or private return path. The private network may include a dedicated tunnel (e.g., a generic routing encapsulation (GRE) tunnel) between a scrub cluster 122 and the customer 108, a private virtual local area network (VLAN), a virtual private network (VPN), or similar type of connection.

At some point, the DDOS attack will come to an end. The end or cessation of the DDOS attack may be determined by the analyzer component 116 and/or the scrub clusters 122. Once the DDOS attack ends, the network 102 may be returned to its normal state depicted in FIG. 1A. Returning the network 102 to its normal state may include deactivating the scrub clusters 122, which releases resources that may then be used by other services or processes. In addition, the rerouting of traffic destined for the customer 108 is reverted. For instance, the BGP and/or Anycast configurations that were changed during the DDOS attack may be reverted to the configurations that existed prior to the DDOS attack.

Figure 2A:
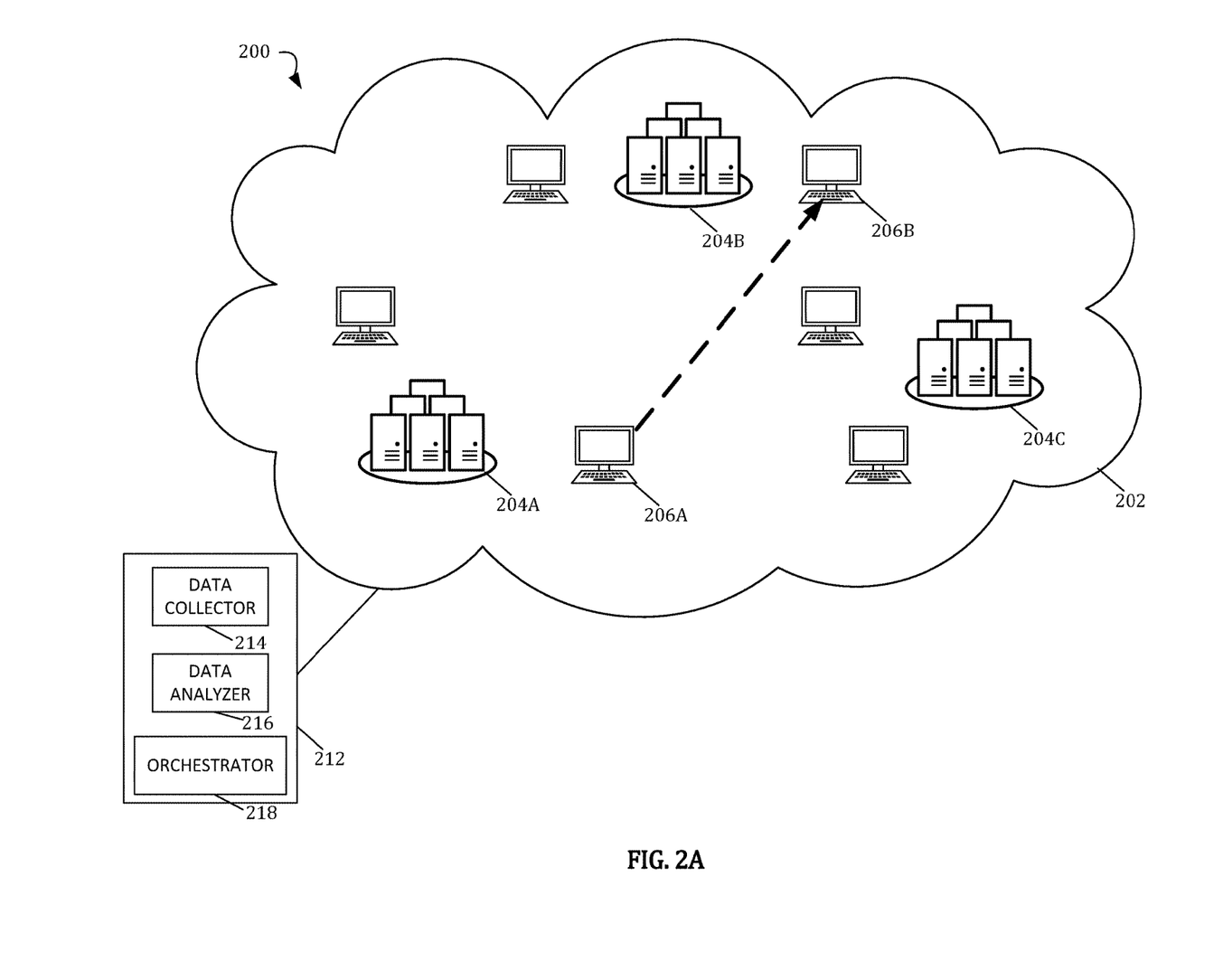
FIG. 2A depicts another example system for mitigating a DDOS attack while under a DDOS attack.

FIG. 2A depicts another example system 200 for mitigating a DDOS attack while under a DDOS attack. In the example system 200, a DDOS attack may originate from within a network 202. As with attacks that originate outside of a network 202, when a DDOS attack originates within the network 202, it is beneficial to mitigate the attack as quickly as possible. With the present technology, it is also possible to mitigate the attack at location proximate to the source of the attack such that malicious traffic consumes only a minimal amount of bandwidth and resources of the network 202.

In the system 200, the network includes a plurality of customers 206 and a plurality of compute nodes 204. The customers 206 may be residential customers or larger scale customers. A customer 206, as used herein, refer to the machine or group of machines for a particular account to which the network 202 provides service. The compute nodes 204 may include routing technology and other computing hardware. For example, the compute nodes 204 may include hardware and software to process requests and perform services requested by the customers 206. The compute nodes 204 may include various components or features, such as a server, a field-programmable gate array (FPGA), a central processing unit (CPU), a graphics processing unit (GPU), storage devices, and network resources, among other possible computing components or features. The components of the compute nodes 204 are intended to provide services and compute data according requests of the customers 206. The computing hardware of the compute nodes 204 may also include software, such as hypervisor, that supports the hosting of virtual machines. The virtual machines are emulations of physical computer systems and can execute VNFs. The compute nodes 204 may be part of an edge compute network that is operated by the same entity as the network 202.

The system 200 also includes a DDOS mitigation subsystem 212 that is substantially similar to the DDOS mitigation subsystem 112 discussed above with reference to FIGS. 1A-1D. For instance, the DDOS mitigation subsystem 212 includes a collector component 214, an analyzer component 216, and an orchestrator component 218. The collector component 214 collects traffic data flowing through the network 202, and the analyzer component 216 analyzes that data to detect attacks, as discussed above.

In the example depicted in FIG. 2A, a DDOS attack is being launched in part by a first customer 206A (or through the use of one or more of the customer's machines). For instance, the customer 206A may be infected with a virus or malware that causes the customer 206A to act as bot in botnet-based attack. The machines generating the attack may be referred to as the attack sources. The DDOS attack is targeting a second customer 206B. Based on the traffic data collected by the collector component 214, a source location for the attack may be determined. The source location may be the location of the customer 206A and/or a location of the source machines. In some examples, there may be multiple source locations when the DDOS attack is launched from source machines in multiple source locations. The determined source location may be a city, state, county, region, or other geographic identifier of one or more of the source machines launching the attack. The source location may also be a more exact location of one or more the source machines, such as global positioning coordinates. The size or bandwidth consumed by the malicious traffic originating from the source location may also be identified.

Proximate hardware or devices for hosting a scrub cluster in or near the source location is then identified. The proximate hardware may be a compute node 204 within the city of the determined source location or a compute node 204 closest to the determined source location. Identifying the proximate hardware may include executing a search for available hardware near the determined source location. For example, available hardware and computing devices, along with their capabilities and locations, may be stored in a database that may be queried. Thus, based on the source location and the bandwidth consumed by malicious traffic, a query may be executed across the database to identify hardware near the source location that has a capability or capacity of hosting enough scrubbers to handle the identified bandwidth consumed by the malicious traffic. Once the proximate hardware is identified, the identified proximate hardware may be queried to confirm capacity and capability to host the scrubbers. If the identified proximate hardware has the capacity and capability, the proximate hardware may send an acknowledgement confirming the capacity and capability. In some examples, proximate hardware in multiple physical locations may be utilized where no single set of proximate hardware has enough capacity to host all the scrubbers required to handle the bandwidth consumed by the malicious traffic. The orchestrator component 218 then causes the activation of a scrub cluster at the identified proximate hardware.

Figure 2B:
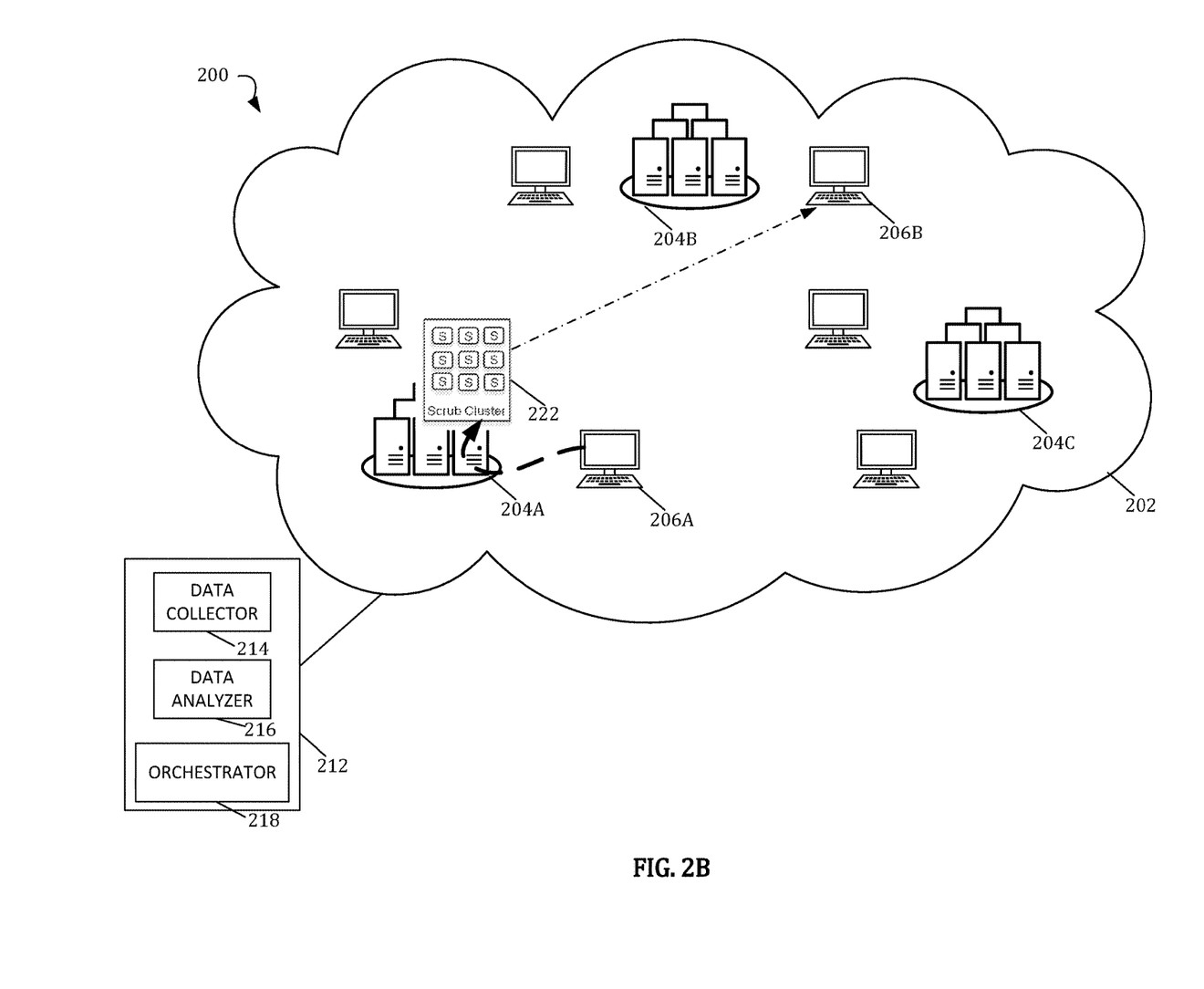
FIG. 2B depicts the example system of FIG. 2A while dynamically mitigating the DDOS attack.

FIG. 2B depicts the example system 200 of FIG. 2A while dynamically mitigating the DDOS attack. In FIG. 2B, the compute node 204A has been identified as the proximate hardware suitable for hosting scrubbers, and a scrub cluster 122 has been activated at compute node 204A. Activating the scrub cluster 222 may include the orchestrator component 218 sending an API call to the compute node 204A to a virtual infrastructure manager of the compute node 204A to spin up a certain number of DDOS scrubbers as VNFs on virtual machines executing on the hardware of the compute node 204A. The number of DDOS scrubbers to be activated in the scrub cluster 222 may be dependent on the size and/or bandwidth consumed by the malicious traffic determined to be originating from the source location.

Traffic directed to the target customer 206B is then rerouted or directed to the scrub cluster 222. Directing or rerouting the traffic may include changing BGP settings or configurations of the network 202. For example, an API call may be sent to network configuration tools to make BGP changes to the network that result in the traffic being rerouted to the scrub cluster 222. The BGP changes may include making Anycast configuration changes that cause the traffic to be rerouted to the scrub cluster 222. By changing the routing paths, the traffic can be rerouted to the scrub cluster 222.

The scrub cluster 222 scrubs the received traffic to remove the malicious traffic and forward the valid traffic to the customer 206B. The valid traffic is forwarded to the customer 206B on a private network. The private network may include a dedicated tunnel between a scrub cluster 222 and the customer 206B, a virtual private network (VPN), or similar type of connection.

Figure 3:
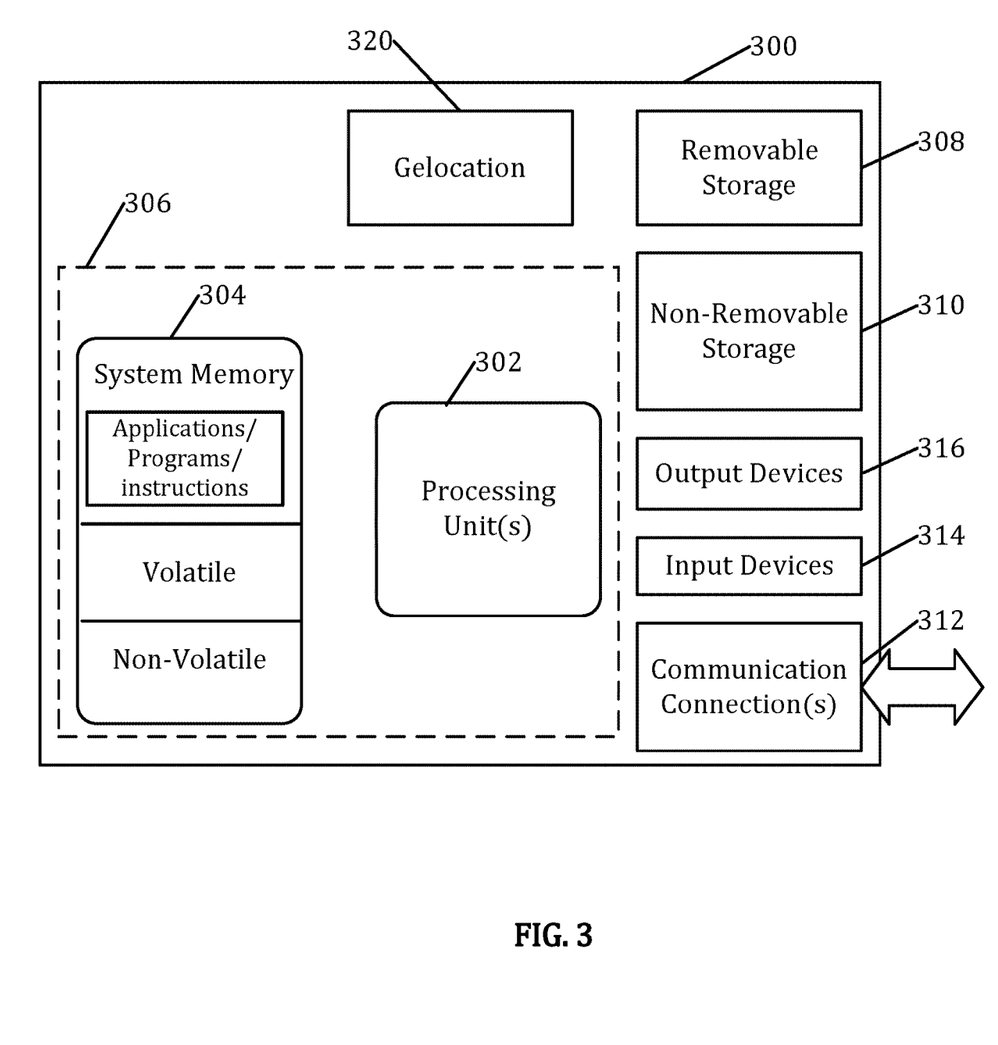
FIG. 3 depicts an example operating environment.

FIG. 3 depicts an example of a suitable operating environment 300 that may be implemented by a customer, a compute node, a DDOS mitigation subsystem 112, and/or other computing devices within the systems discussed herein. In its most basic configuration, operating environment 300 typically includes at least one processing unit 302 and memory 304. The processing unit may be a processor, which is hardware. Depending on the exact configuration and type of computing device, memory 304 (storing, instructions to perform the motion detection techniques disclosed herein) may be volatile (such as RAM), non-volatile (such as ROM, flash memory, etc.), or some combination of the two. This most basic configuration is illustrated in FIG. 3 by dashed line 306. The memory 304 stores instructions that, when executed by the processing unit(s) 302, perform the processes and operations described herein, such as detecting DDOS attacks, activating scrub clusters, and rerouting traffic, among other functions. Further, environment 300 may also include storage devices (removable 308, and/or non-removable 310) including, but not limited to, solid-state, magnetic disks, optical disks, or tape. Similarly, environment 300 may also have input device(s) 314 such as keyboard, mouse, pen, voice input, etc. and/or output device(s) 316 such as a display, speakers, printer, etc. Additional communication connections 312 may also be included that allow for further communication with LAN, WAN, point-to-point, etc. Operating environment 300 may also include geolocation devices 320, such as a global positioning system (GPS) device.

Operating environment 300 typically includes at least some form of computer readable media. Computer readable media can be any available media that can be accessed by processing unit 302 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media is non-transitory and does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, microwave, and other wireless media. Combinations of the any of the above should also be included within the scope of computer readable media.

Figure 4:
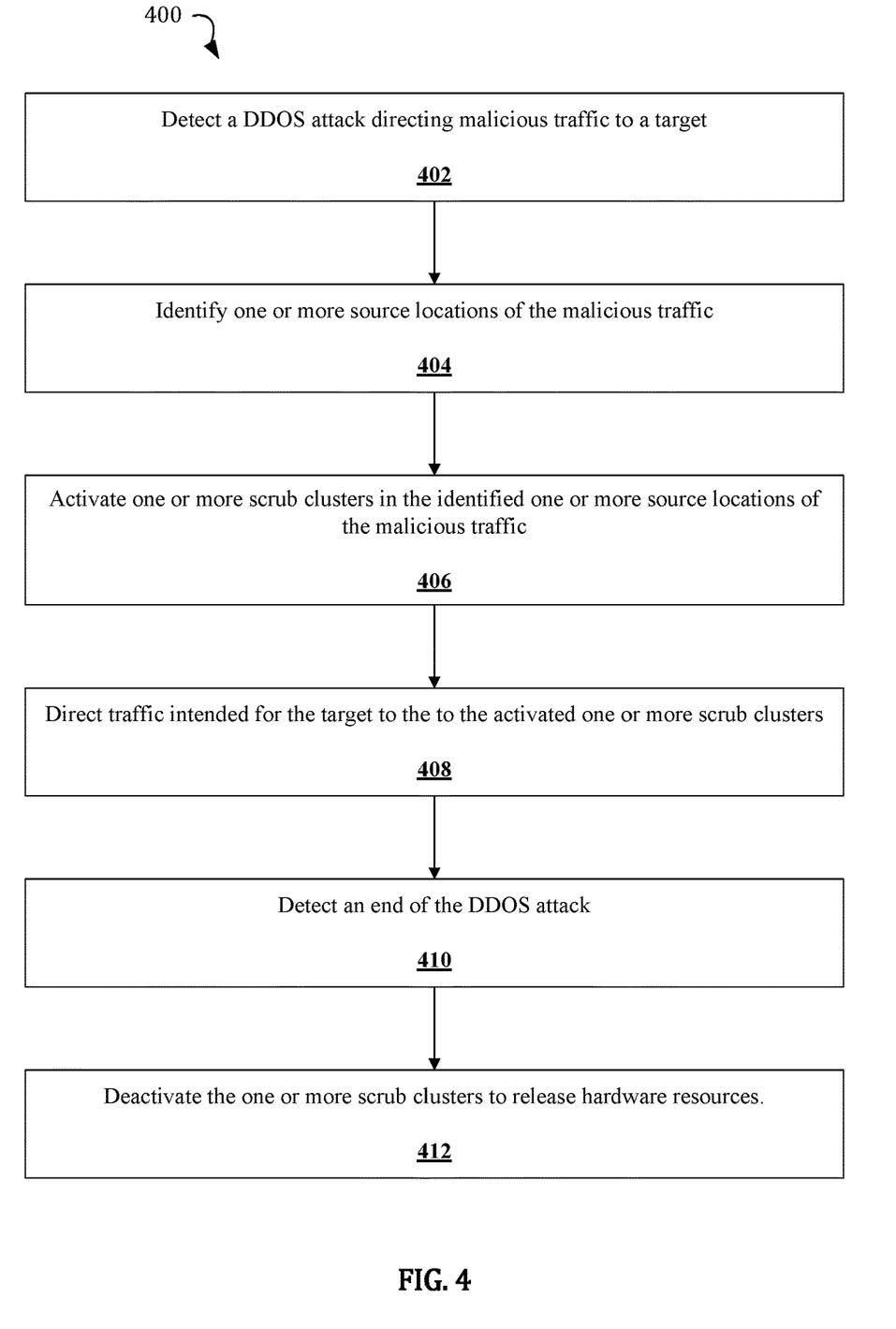
FIG. 4 depicts an example method for dynamically mitigating a DDOS attack.

FIG. 4 depicts an example method 400 for dynamically mitigating a DDOS attack. At operation 402, a DDOS attack is detected. The detected DDOS attack is directing malicious traffic to a particular target of a network. The identity of the target may be determined based on the destination IP address of packets in the malicious traffic of the DDOS attack. The detection of the DDOS attack may be performed based on an analysis of traffic data collected for the network.

At operation 404, one or more source locations of the malicious traffic is identified. The source locations of the malicious traffic may be determined from an analysis of the malicious traffic. For example, the source IP address may be utilized to determine the source locations of the malicious traffic. In some examples, the source locations may be the location at which the malicious traffic enters the network, such as peering points of entry or gateways. Because the attack is distributed, there may be multiple source locations identified from where malicious traffic is being generated. In other examples, the attack may be originating from a single source location.

At operation 406, one or more scrub clusters are activated in the one or more source locations identified in operation 404. A scrub cluster may be activated in each of the identified source locations. In other examples, scrub clusters may be activated in less than all of the identified source locations. For example, if traffic consuming minimal bandwidth is being generated in one of the source locations, a scrub cluster may not be activated in that particular source location. Rather, the minimal bandwidth generated from that source location may be directed to a scrub cluster at another location with minimal negative effects on the network due to bandwidth consumption. The scrub clusters may be activated as VNFs on virtual machines executing on hardware in the source locations. The activation of the scrub clusters may be performed through virtual network orchestration, and an API call may be sent to a virtual infrastructure manager to spin up a certain number of DDOS scrubbers in the scrub cluster as VNFs on the virtual machines. The number of scrubbers and the type of scrubbers in each of the scrub clusters may be based on the size and type of the DDOS attack.

During the DDOS attack, the number of activated scrubbers in the scrub clusters may also change if the bandwidth consumed by the DDOS attack changes. For instance, if the bandwidth consumed by the DDOS attack increases, additional scrubbers may be activated. In contrast, if the bandwidth consumed by the DDOS attack decreases, currently activated scrubbers in the scrub clusters may be deactivated.

At operation 408, traffic intended for the target of the attack is directed to the one or more scrub clusters activated in operation 406. The traffic may be directed or rerouted by changing the routing configuration to the target. For example, directing or rerouting the traffic may include changing BGP settings or configurations of the network. For example, an API call may be sent to network configuration tools to make BGP changes to the network that result in the traffic being rerouted to the scrub cluster. The BGP changes may include making Anycast configuration changes that cause the traffic to be rerouted to the scrub cluster. The scrub clusters may also announce the IP address or blocks of IP addresses associated with the target. By changing the routing path, the traffic can be rerouted to the scrub cluster. The scrub clusters then scrub the traffic to discard the malicious traffic and forward the valid traffic to the target.

At operation 410, an end or cessation of the DDOS attack is detected. The end of the DDOS attack may be detected by the scrub clusters and/or other network traffic analysis components or tools. Upon the cessation of the DDOS attack, the one or scrub clusters that were activated in operation 406 are deactivated at operation 412. Deactivating the scrub clusters allows for resources of the hardware and/or virtual machines to be released and potentially used for other computing or networking functions. Upon deactivation of the scrub clusters, the traffic is also rerouted back to the target. For instance, as the scrub clusters are deactivated, the scrub clusters also cease announcing the IP address(es) of the target.

Figure 5A:
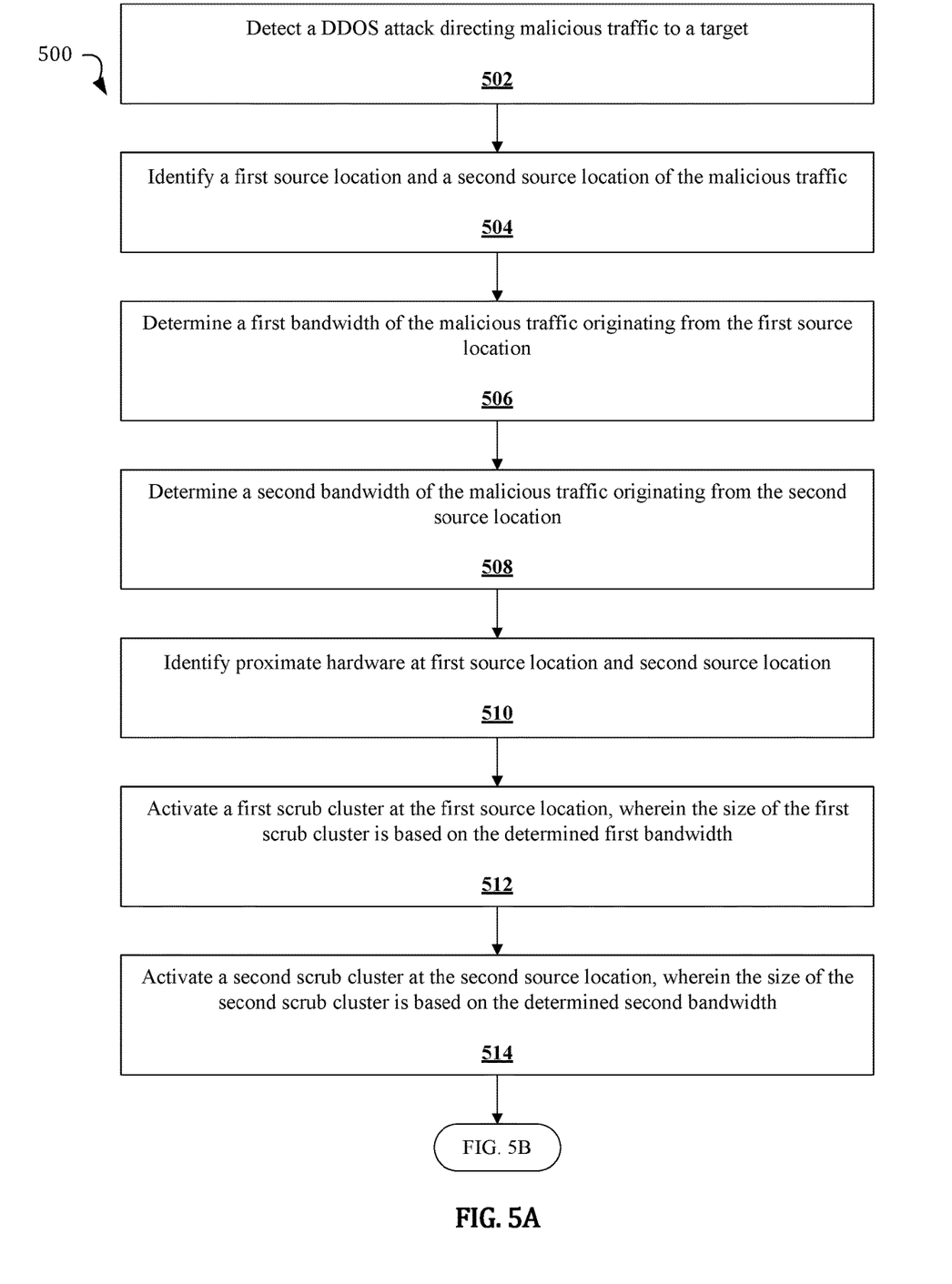
FIGS. 5A-B depict another example method for dynamically mitigating a DDOS attack.
Figure 5B:
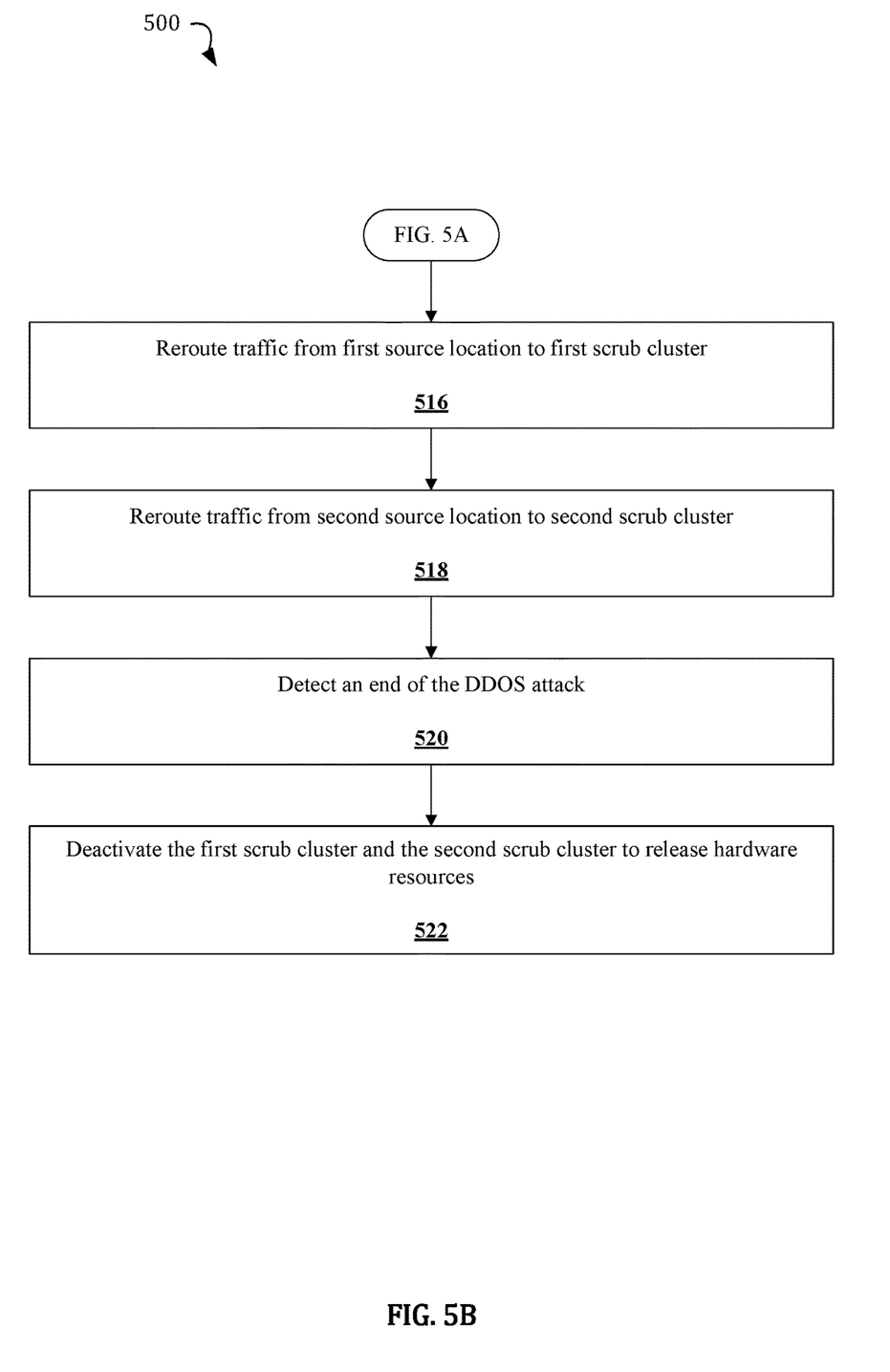

FIGS. 5A-B depict another example method 500 for dynamically mitigating a DDOS attack. At operation 502, a DDOS attack is detected. The detected DDOS attack is directing malicious traffic to a particular target of a network. The identity of the target may be determined based on the destination IP address of packets in the malicious traffic of the DDOS attack. The detection of the DDOS attack may be performed based on an analysis of traffic data collected for the network.

At operation 504, a first source location and a second source location of the malicious traffic are identified. The first source location and the second source location may be determined from an analysis of the malicious traffic. For example, the source IP address may be utilized to determine the first source location of the malicious traffic. In some examples, the source locations may be the location at which the malicious traffic enters the network. For instance, the first source location may be a first peering point of entry or gateway and the second source location may be a second peering point of entry or gateway. In some examples where the source location is considered the location of the peering point of entry, the source location may be considered to be the city at which the peering point of entry is physically located.

At operation 506, a first bandwidth consumed by the malicious traffic originating from the first source location is determined. At operation 508, a second bandwidth consumed by the malicious traffic originating from the second source location is determined. The consumed bandwidth is indicative of the size of the attack and may be used to determine the size of the scrub clusters that are activated in the source locations.

At operation 510, proximate hardware is identified at the first source location and the second source location. Where the source location is a city, proximate hardware may be identified within the city or closest to the city. As an example, the proximate hardware may be a compute node within the city of the determined source location. Where the source location is a peering point of entry, the proximate hardware may be located in the same facility location as the peering point of entry. Identifying the proximate hardware may include executing a search for available hardware near the determined source location. For example, available hardware and computing devices, along with their capabilities and locations, may be stored in a database that may be queried. Thus, based on the source location and the bandwidth consumed by the malicious traffic, a query may be executed across the database to identify hardware near the source location that has a capability or capacity of hosting enough scrubbers to handle the identified bandwidth consumed by the malicious traffic. Once the proximate hardware is identified, the identified proximate hardware may be queried to confirm capacity and capability to host the scrubbers. If the identified proximate hardware has the capacity and capability, the proximate hardware may send an acknowledgement confirming the capacity and capability. In some examples, proximate hardware in multiple physical locations may be utilized where no single set of proximate hardware has enough capacity to host all the scrubbers required to handle the bandwidth consumed by the malicious traffic originating from the source location. In addition, the proximate hardware may be identified based on latency or cost of transmitting the malicious data through the network. For instance, the distance traffic travels through a network may not directly correspond to the geographic locations of sender and recipient. Accordingly, the identification of proximate hardware may be based on the network distance the traffic must travel from the source location.

At operation 512, a first scrub cluster is activated at the first source location. The size of the first scrub cluster is based on the first bandwidth determined in operation 506. For instance, the number of scrubbers in the first scrub cluster (e.g., the capacity of the scrub cluster) is sized based on the bandwidth consumed by the malicious traffic originating from the second source location. The first scrub cluster may be activated as VNFs on virtual machines executing on the proximate hardware identified in the first source location. At operation 514, a second scrub cluster is activated at the second source location. The size of the second scrub cluster is based on the second bandwidth determined in operation 508. The second scrub cluster may be activated as VNFs on virtual machines executing on the proximate hardware identified in the second source location. During the DDOS attack, the bandwidth consumed by the malicious traffic may change, and the size of the scrub clusters may be adjusted based on the changes in bandwidth consumption. For example, at a time subsequent to activating the scrub cluster in the first source location, an updated bandwidth consumed by the malicious traffic originating from the first source location may be determined. The size of the first scrub cluster may then be adjusted based on the determined updated bandwidth consumption.

At operation 516 (FIG. 5B), traffic originating from the first source location and directed to the target is rerouted to first scrub cluster. At operation 518, traffic originating from the second source location is rerouted to the second scrub cluster. Rerouting the traffic to the respective scrub clusters may include changing BGP settings or configurations of the network. For example, an API call may be sent to network configuration tools to make BGP changes to the network that result in the traffic being rerouted to the respective scrub clusters. The BGP changes may include making Anycast configuration changes that cause the traffic to be rerouted to the scrub cluster. The first scrub cluster and the second scrub cluster may also announce the IP address or blocks of IP addresses associated with the target. The first scrub cluster and the second scrub cluster then scrub the traffic that is received.

At operation 520, an end of the DDOS attack is detected. The end of the DDOS attack may be detected by the scrub clusters and/or other network traffic analysis components or tools. Upon the cessation of the DDOS attack, the first scrub cluster and the second scrub cluster are deactivated at operation 522. Deactivating the scrub clusters allows for resources of the hardware and/or virtual machines to be released and potentially used for other computing or networking functions. Upon deactivation of the scrub clusters, the traffic is also rerouted back to the target. For instance, as the scrub clusters are deactivated, the scrub clusters also cease announcing the IP address(es) of the target.

Figure 6:
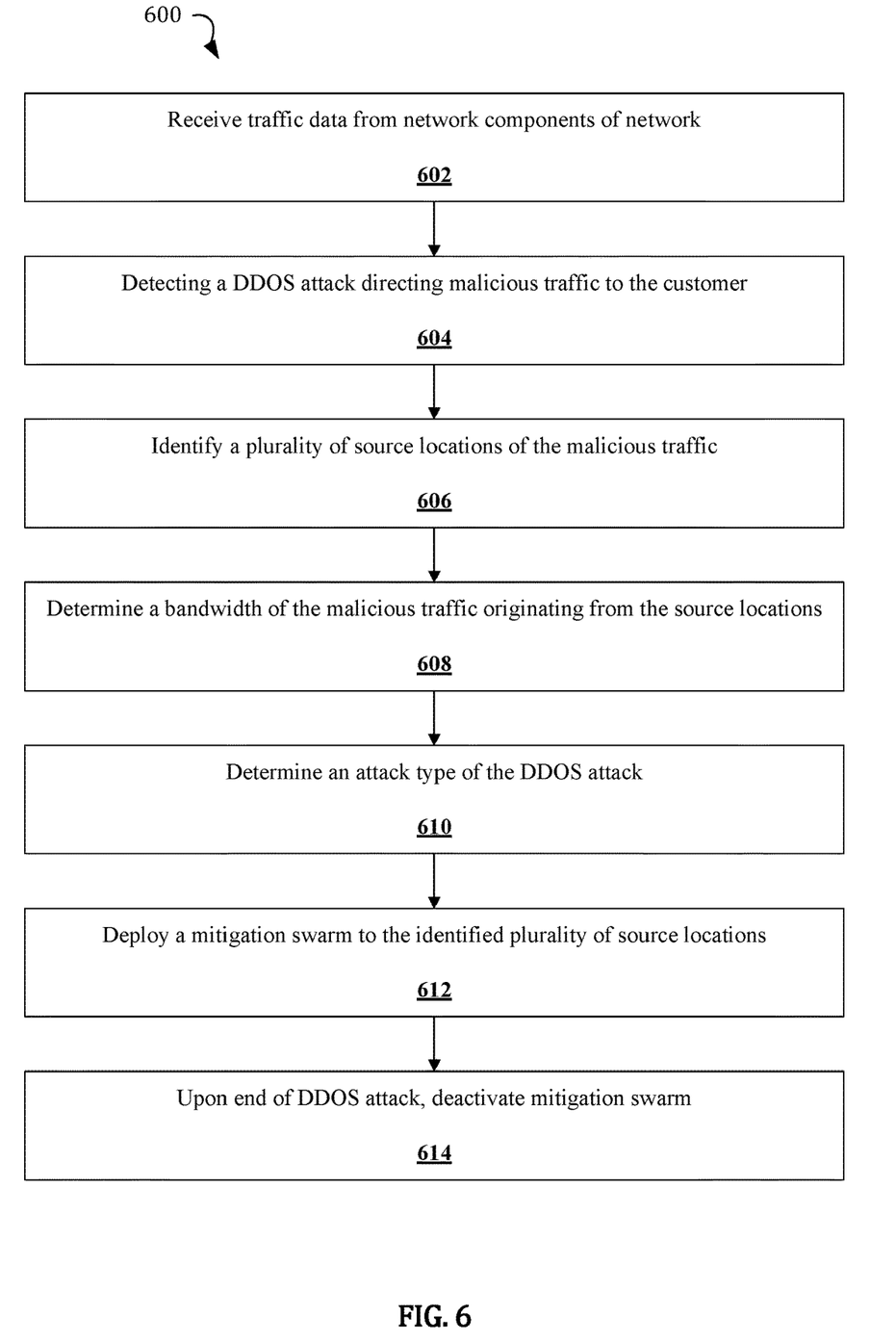
FIG. 6 depicts another example method for dynamically mitigating a DDOS attack.

FIG. 6 depicts another example method 600 for dynamically mitigating a DDOS attack. At operation 602, traffic data from network components of a network are received or collected. The collected data may be NetFlow data and the collector component 114 a NetFlow collector. The collected data may also include other types of flow data, such J-Flow, s-Flow, or Netstream, among others. The traffic data may include information such as source IP address, destination IP address, IP protocol, source port, destination port, and or the type of service associated with the packets or datagrams in the traffic. The traffic data may also include other information about different layers of the OSI model or stack.

At operation 604, a DDOS attack is detected. The detected DDOS attack is directing malicious traffic to a customer of the network. At operation 606, a plurality of source locations for the detected DDOS attack are identified. The source locations of the malicious traffic may be determined from an analysis of the malicious traffic. For example, the source IP address may be utilized to determine the source locations of the malicious traffic. In some examples, the source locations may be the location at which the malicious traffic enters the network, such as peering points of entry or gateways. Because the attack is distributed, there may be multiple source locations identified from where malicious traffic is being generated.

At operation 608, bandwidths for the malicious traffic being generated at each of the source locations in the plurality of source locations are determined. Thus, the size of the malicious traffic being generated at each source location may be determined. At operation 610, a type of the DDOS attack may be identified. The identification of the type of attack may be based on an analysis of the traffic data for the malicious attack. For example, the DDOS attack may be classified as a domain name system (DNS) attack if the malicious traffic is directed to a particular port number, such as port 53. Other types of attacks may also be identified based on the port number of the malicious traffic. The application layer (e.g., layer 7) data, among other layers of the OSI model, may also be analyzed to determine the type of attack.

At operation 612, a mitigation swarm is deployed to the plurality of source locations identified in operation 606. Deploying the mitigation swarm includes activating scrub clusters at the plurality of source locations. In some examples, a scrub cluster is activated at each of the plurality of source locations. The size of each scrub cluster (e.g., the number or scrubbers in the cluster and/or the capacity of the scrub cluster) may be based on the bandwidth consumed by the malicious data originating from each source location determined in operation 608. In addition, the type of scrub clusters that are activated may be based on the type of DDOS attack determined in operation 610. For instance, the scrubbers in the scrub clusters may be configured or tuned to better handle a particular type of DDOS attack, such as a DNS technique. At operation 614, upon the end of the DDOS attack, the mitigation swarm is deactivated to release resources at the identified source locations.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure. In addition, some aspects of the present disclosure are described above with reference to block diagrams and/or operational illustrations of systems and methods according to aspects of this disclosure. The functions, operations, and/or acts noted in the blocks may occur out of the order that is shown in any respective flowchart. For example, two blocks shown in succession may in fact be executed or performed substantially concurrently or in reverse order, depending on the functionality and implementation involved.

This disclosure describes some embodiments of the present technology with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art. Further, as used herein and in the claims, the phrase "at least one of element A, element B, or element C" is intended to convey any of: element A, element B, element C, elements A and B, elements A and C, elements B and C, and elements A, B, and C. Further, one having skill in the art will understand the degree to which terms such as "about" or "substantially" convey in light of the measurements techniques utilized herein. To the extent such terms may not be clearly defined or understood by one having skill in the art, the term "about" shall mean plus or minus ten percent.

Although specific embodiments are described herein, the scope of the technology is not limited to those specific embodiments. Moreover, while different examples and embodiments may be described separately, such embodiments and examples may be combined with one another in implementing the technology described herein. One skilled in the art will recognize other embodiments or improvements that are within the scope and spirit of the present technology. Therefore, the specific structure, acts, or media are disclosed only as illustrative embodiments. The scope of the technology is defined by the following claims and any equivalents therein.

What is claimed is:

1. A computer-implemented method for dynamically mitigating a distributed-denial-of-service (DDOS) attack, the computer-implemented method comprising:
   detecting a DDOS attack directing malicious traffic to a target;
   identifying one or more source locations of the malicious traffic;
   in response to detecting the DDOS attack, activating one or more scrub clusters in the identified one or more source locations of the malicious traffic; and
   directing traffic intended for the target to the to the activated one or more scrub clusters.

2. The computer-implemented method of claim 1, wherein activating the one or more scrub clusters includes activating the scrub clusters as virtual network functions (VNFs).

3. The computer-implemented method of claim 1, further comprising identifying available hardware at the identified source locations, and wherein the one or more scrub clusters are activated as VNFs on virtual machines of the identified available hardware.

4. The computer-implemented method of claim 3, wherein the identified available hardware is part of a peering point of entry.

5. The computer-implemented method of claim 1, wherein directing the traffic intended for the target to the activated one or more scrub clusters comprises changing border gateway protocol (BGP) settings.

6. The computer-implemented method of claim 1, further comprising:
   determining a bandwidth consumed by the malicious traffic originating from the identified one or more source locations; and
   wherein a capacity of the one or more scrub clusters is based on the determined bandwidth.

7. The computer-implemented method of claim 1, further comprising directing valid traffic from the one or more scrub clusters to the target over a private connection.

8. A computer-implemented method for dynamically mitigating a distributed-denial-of-service (DDOS) attack, the computer-implemented method comprising:
   detecting a DDOS attack directing malicious traffic to a target;
   identifying a first source location and a second source location of the malicious traffic;
   determining a first bandwidth consumed by the malicious traffic originating from the first source location;
   determining a second bandwidth consumed by the malicious traffic originating from the second source location; and
   in response to detecting the DDOS attack:
      activating a first scrub cluster at the first source location, wherein a size of the first scrub cluster is based on the determined first bandwidth;
      activating a second scrub cluster at the second source location, wherein a size of the second scrub cluster is based on the determined second bandwidth.

9. The computer-implemented method of claim 8, wherein activating the first scrub cluster includes activating the first scrub clusters as a VNF.

10. The computer-implemented method of claim 8, wherein the first source location is a city.

11. The computer-implemented method of claim 8, wherein the first source location is a peering point of entry.

12. The computer-implemented method of claim 8, further comprising:
   subsequent to activating the first scrub cluster, determining an updated bandwidth consumed by the malicious traffic originating from the first source location; and
   based on the determined updated bandwidth, adjusting a size of the first scrub cluster.

13. The computer-implemented method of claim 8, further comprising:
   determining an attack type of the DDOS attack; and
   based on the determined attack type, selecting a scrubber type for the first scrub cluster.

14. The computer-implemented method of claim 13, wherein the attack type is determined based on a destination port of the malicious traffic.

* * * * *